United States Patent
Farhan et al.

(10) Patent No.: US 9,959,210 B2
(45) Date of Patent: *May 1, 2018

(54) SYSTEMS AND METHODS FOR DYNAMIC OPTIMIZATION OF FLASH CACHE IN STORAGE DEVICES

(71) Applicant: DELL PRODUCTS, LP, Round Rock, TX (US)

(72) Inventors: Munif F. Farhan, Round Rock, TX (US); William F. Sauber, Georgetown, TX (US); Dina A. Eldin, Clyde Hill, WA (US)

(73) Assignee: DELL PRODUCTS, LP, Round Rock, TX (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/133,697

(22) Filed: Apr. 20, 2016

(65) Prior Publication Data
US 2016/0232100 A1    Aug. 11, 2016

Related U.S. Application Data

(63) Continuation of application No. 13/691,469, filed on Nov. 30, 2012, now Pat. No. 9,330,007.

(51) Int. Cl.
*G06F 12/00* (2006.01)
*G06F 12/0868* (2016.01)
(Continued)

(52) U.S. Cl.
CPC .......... *G06F 12/0868* (2013.01); *G06F 3/061* (2013.01); *G06F 3/0656* (2013.01);
(Continued)

(58) Field of Classification Search
CPC .. G06F 12/0868; G06F 3/0656; G06F 3/0676; G06F 3/061; G06F 3/0679;
(Continued)

(56) References Cited

U.S. PATENT DOCUMENTS 5,590,300 A    12/1996  Lautzenheiser
6,598,174 B1    7/2003  Parks et al.
(Continued)

*Primary Examiner* — Tuan Thai
*Assistant Examiner* — Tasnima Matin
(74) *Attorney, Agent, or Firm* — Larson Newman, LLP

(57) ABSTRACT

In various embodiments, a storage device includes a magnetic media, a cache memory, and a drive controller. In embodiments, the drive controller is configured to establish a portion of the cache memory as an archival zone having a cache policy to maximize write hits. The drive controller is further configured to pre-erase the archival zone, direct writes from a host to the archival zone, and flush writes from the archival zone to the magnetic media. In embodiments, the drive controller is configured to establish a portion of the cache memory as a retrieval zone having a cache policy to maximize read hits. The drive controller is further configured to pre-fetch data from the magnetic media to the retrieval zone, transfer data from the retrieval zone to a host upon request by the host, and transfer read ahead data to the retrieval zone to replace data transferred to the host.

20 Claims, 7 Drawing Sheets

(51) Int. Cl.
*G06F 12/0862* (2016.01)
*G06F 12/0804* (2016.01)
*G06F 12/0871* (2016.01)
*G06F 3/06* (2006.01)
*G06F 12/121* (2016.01)

(52) U.S. Cl.
CPC .......... *G06F 3/0676* (2013.01); *G06F 3/0679* (2013.01); *G06F 12/0804* (2013.01); *G06F 12/0862* (2013.01); *G06F 12/0871* (2013.01); *G06F 12/121* (2013.01); *G06F 2212/221* (2013.01); *G06F 2212/222* (2013.01); *G06F 2213/0002* (2013.01); *G06F 2213/0016* (2013.01); *G06F 2213/0024* (2013.01)

(58) Field of Classification Search
CPC ............. G06F 12/0871; G06F 12/0804; G06F 12/0862; G06F 2212/221; G06F 2213/0024; G06F 2213/0016; G06F 2213/0002; G06F 2212/222
See application file for complete search history.

(56) References Cited

U.S. PATENT DOCUMENTS

| | | | |
|---|---|---|---|
| 7,356,728 | B2 | 4/2008 | Tawil et al. |
| 7,515,500 | B2 | 4/2009 | Ahvenainen et al. |
| 2001/0008008 | A1 | 7/2001 | Mori |
| 2005/0114606 | A1 | 5/2005 | Matick et al. |
| 2005/0144223 | A1 | 6/2005 | Yang et al. |
| 2005/0289386 | A1 | 12/2005 | Tawil et al. |
| 2006/0004957 | A1 | 1/2006 | Hand et al. |
| 2008/0104328 | A1* | 5/2008 | Yoshikawa ......... G06F 12/0862 711/137 |
| 2008/0114930 | A1 | 5/2008 | Sanvido et al. |
| 2009/0113235 | A1 | 4/2009 | Selinger |
| 2009/0150588 | A1 | 6/2009 | Wang et al. |
| 2009/0177918 | A1 | 7/2009 | Abali et al. |
| 2009/0182836 | A1 | 7/2009 | Aviles et al. |
| 2010/0180065 | A1 | 7/2010 | Cherian et al. |
| 2010/0312961 | A1 | 12/2010 | Koul et al. |
| 2011/0202707 | A1 | 8/2011 | Moon et al. |
| 2013/0339407 | A1 | 12/2013 | Sharpe et al. |

* cited by examiner

SYSTEMS AND METHODS FOR DYNAMIC OPTIMIZATION OF FLASH CACHE IN STORAGE DEVICES

CROSS REFERENCE TO RELATED APPLICATION(S)

This application is a continuation of U.S. patent application Ser. No. 13/691,469, entitled "Systems and Methods for Dynamic Optimization of Flash Cache in Storage Devices," filed on Nov. 30, 2012, the disclosure of which is hereby expressly incorporated by reference in its entirety.

FIELD OF THE DISCLOSURE

This disclosure relates generally to information handling systems, and more particularly to systems and methods for dynamic optimization of flash cache in storage devices.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
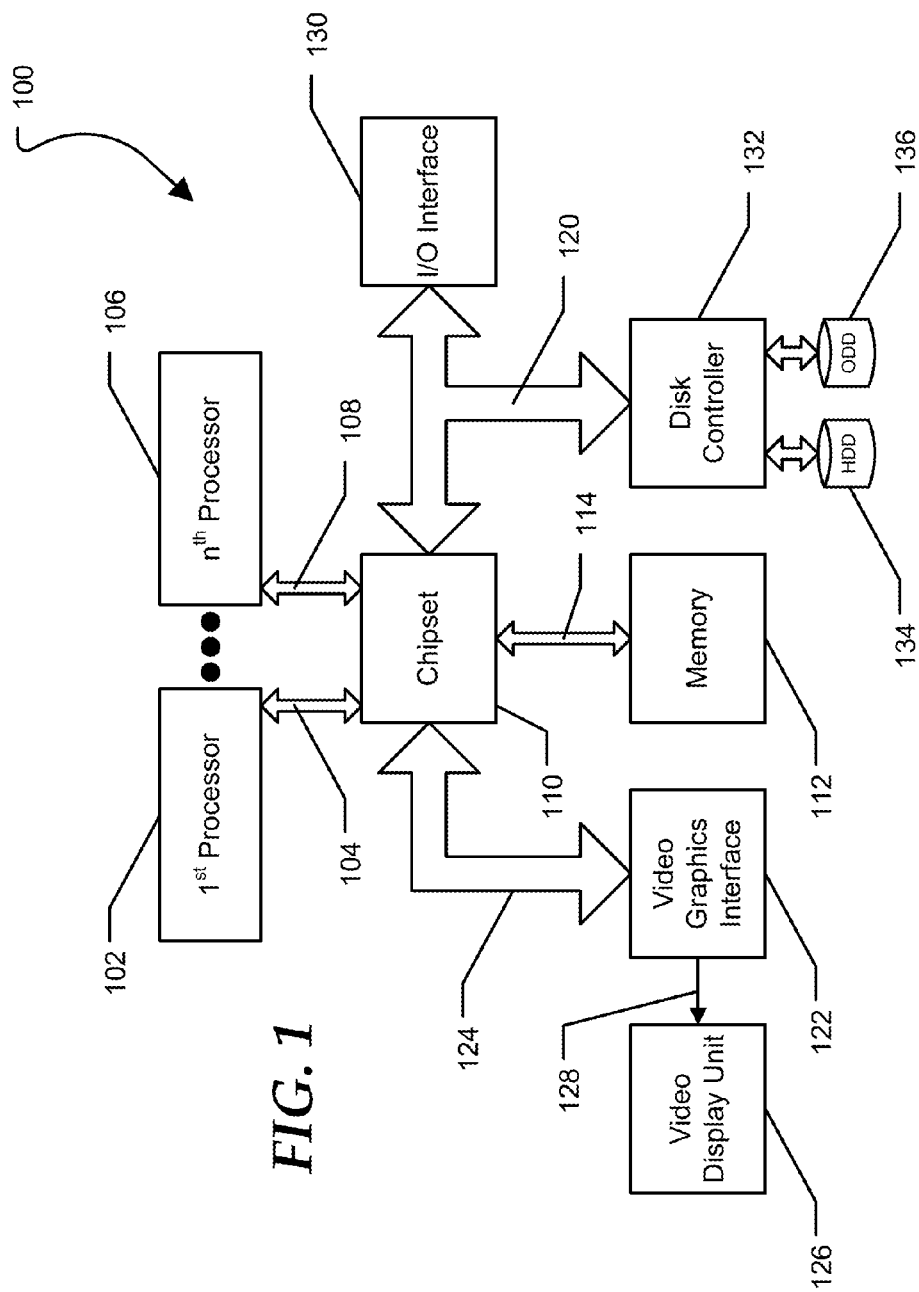
FIG. 1 illustrates a block diagram of an information handling system according to one aspect of the disclosure.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110, including an AHA enabled-chipset, can include a memory controller hub and an input/output (I/O) controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can be generally considered an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 MHz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

Figure 2:
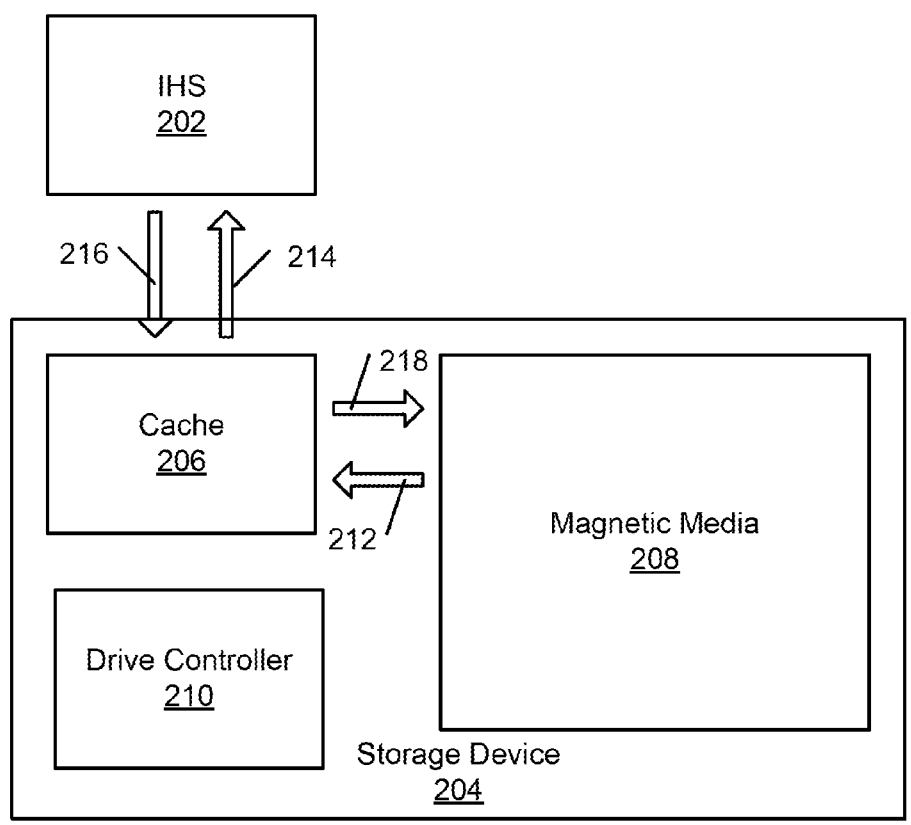
FIGS. 2 through 4 are block diagrams illustrating the information flow between an information handling system and a storage device.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive FIG. 2 shows the information flow when an information handling system 202 accesses frequently used information from a storage device 204. Storage device 204 can include a cache 206, a magnetic media 208, and a drive controller 210. Cache 206 can be a volatile memory such as dynamic random access memory (DRAM), a non-volatile memory such as non-volatile random access memory (NVRAM) like flash memory, or any combination thereof. Cache 206 provides faster read or write speeds compared to the magnetic media, thereby providing a performance improvement when data is read from or written to cache 206 rather than magnetic media 208.

In general, cache 206 has a significantly smaller capacity than magnetic media 208. Additionally, information stored in cache 206 may also be stored in the magnetic media. For example, changes to the information stored in cache 206 may be written to magnetic media 208 and a portion of the information from magnetic media 208 may be read into cache 206.

When a portion of cache 206 is configured in a performance mode, such that frequently used data is stored in cache 206, frequently used data can be read from magnetic media 208 to cache 206 as illustrated by arrow 212. Information handling system 202 can access the frequently used data from cache 206 as illustrated by arrow 214. When changes are made to the frequently used data, information handling system 202 can write the data to cache 206, as illustrated by arrow 216. The changes made to the frequently used data can be propagated from the copy of the frequently used data that is stored in cache 206 to the copy of the frequently used data that is stored in magnetic media 208, as illustrated by arrow 218.

The drive controller 210 can communicate with information handling system 202 to provide a list of modes supported by storage device 204 and the available capacity of cache 206. Additionally, the drive controller can configure portions of cache 206 to operate in a performance mode, an archival mode, or a retrieval mode, as described in Table 1.

Figure 3:
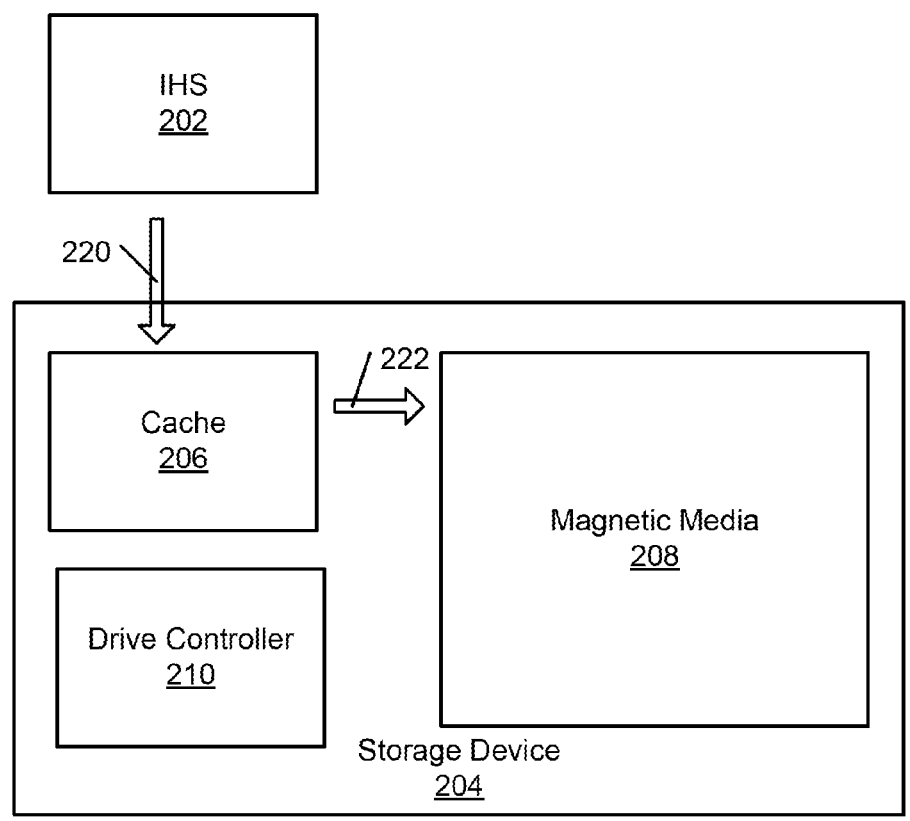

FIG. 3 shows the information flow when information handling system 202 is performing a large write, such as when performing a backup, to storage device 204. When performing a large write, a portion of cache 206 can be configured for archival mode. The NVM portion of cache 206 configured for archival mode can be maintained in a primarily empty state. As information is written to storage device 204 from information handling system 202 the data can be written to the cache 206, as illustrated by arrow 220. The data can be copied or transferred from cache 206 to magnetic media 208, as illustrated by arrow 222, and the space in cache 206 can be released so that the space can be used for receiving additional data from information handling system 202. By placing a portion of cache 206 in archival mode, information handling system 202 can quickly write data to NVM cache 206 at higher performance.

In various embodiments, drive controller 210 can auto detect a large write or series of continuous write commands, such as a backup of another storage device or storage of large files, such as media files. Upon detection, drive controller 210 can dynamically configure a portion of cache 206 for archival mode.

Figure 4:
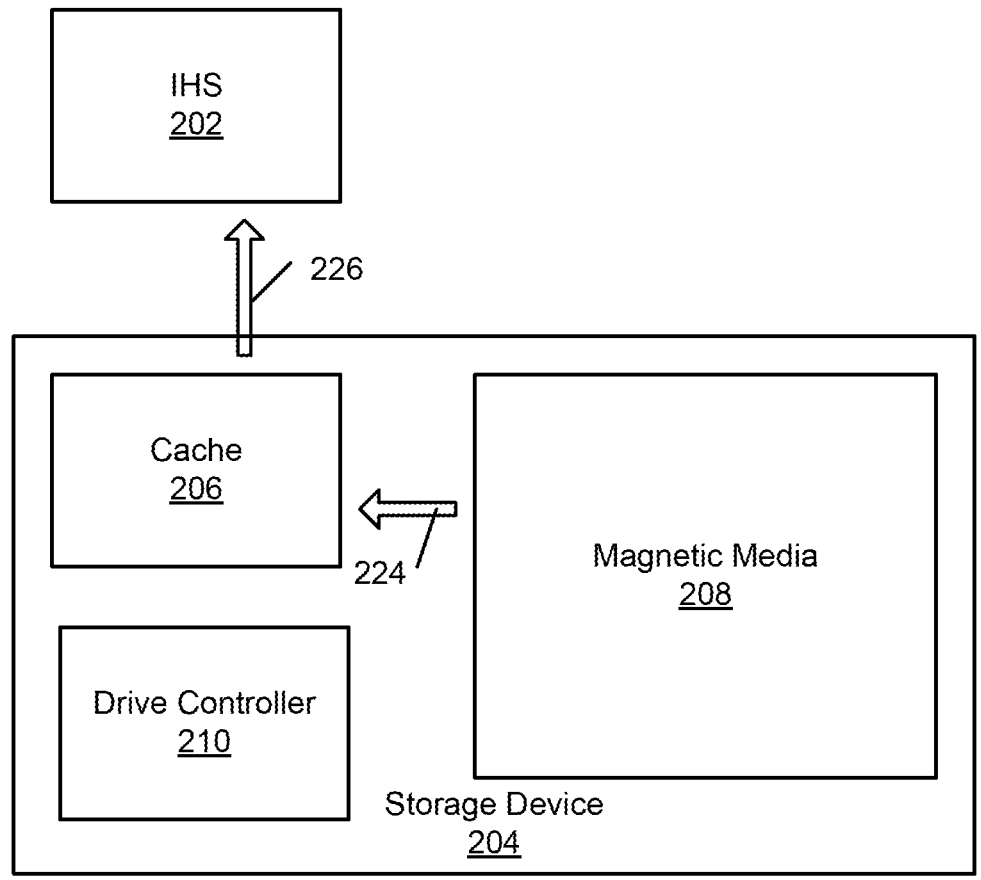

FIG. 4 shows the information flow and information handling system to go to his performing a large read series of continuous read commands, such as when restoring from a backup, from storage device 204. When performing a large read, a portion of cache 206 can be configured for retrieval mode. The portion of cache 206 configured for retrieval mode can be maintained in a substantially full state with data perfected from magnetic media 208. Pre-fetched data can be transferred from magnetic media 208 to cache 206, as illustrated by arrow 224. Information handling system 202 can retrieve the data from cache 206, as illustrated by arrow 226. By placing a portion of cache 206 in retrieval mode, information handling system 202 can quickly retrieve data from cache 206 while minimizing the delay caused by reading from magnetic media 208 or waiting for magnetic media to spin up for data retrieval.

In various embodiments, drive controller 210 can detect a large read or series of large read, such as retrieval from a backup or accessing large files such as media files for playback. Upon detection, drive controller 210 can dynamically configure a portion of cache 206 for retrieval mode.

Figure 5:
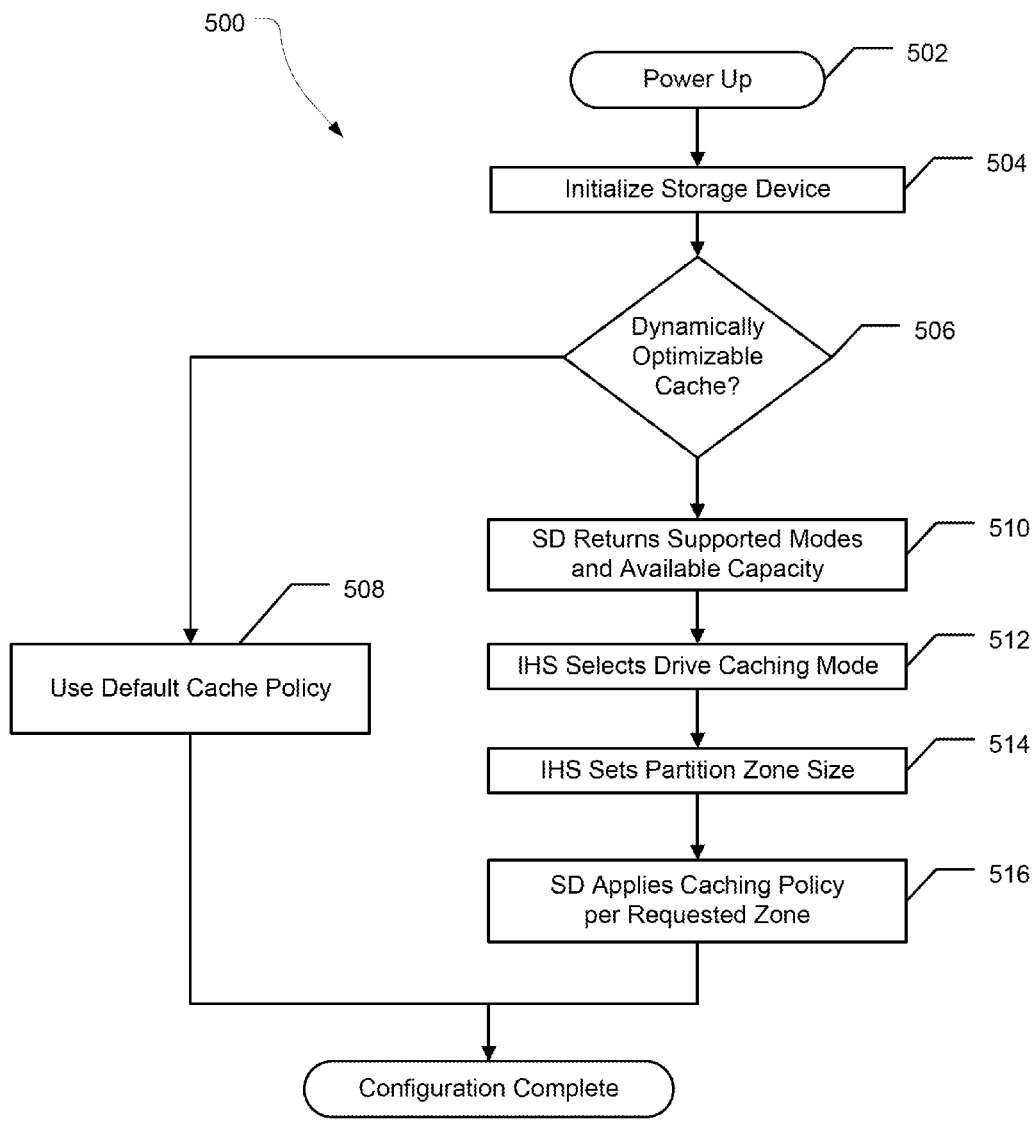
FIG. 5 is a flow diagram illustrating a method for initializing a storage device.

FIG. 5 shows a method 500 for initializing and selecting features of a storage device, in accordance with various embodiments. At 502, the storage device is connected to the information handling system, such as information handling system 100 and powered up. The storage device can be an internal storage device that is part of information handling system or an external storage device. The storage device can be powered up when the information handling system is powered on, or the storage device can be powered up and attached to the information handling system that is already in operation.

At 504, the storage device can be initialized. In particular embodiments, a storage device control can be initialized and can establish connectivity to the cache and to the magnetic media read/write heads. Further, communication between the information handling system and the storage device can be established.

At 506, it can be determined if the storage device supports a dynamically optimizable cache. The storage device can support the dynamically optimizable cache when the cache policy of the cache can be changed depending on an application currently utilizing the storage device.

When the storage device does not support a dynamically optimizable cache, such as when the storage device has a static cache policy, the storage device can be initialized with a default or standard cache policy, such as a "most frequently used data" cache policy, as illustrated at 508.

Alternatively, at 510, when the storage device supports a dynamically optimizable cache, the storage device can provide a list of supported modes and available cache capacity to the information handling system. For example, the storage device can indicate support for a performance mode, a backup archival mode, a backup retrieval mode, a mixed mode, or any combination thereof. Various modes are described in Table 1 below.

TABLE 1

| Cache Mode | Benefit | Cache Management Policy | Caching Policy Objective |
|---|---|---|---|
| Performance | Improved applications data access and response | Frequent, pinned user data stored in cache | Keep flash full, maximize read cache hits out of flash. |
| Backup Archival Mode | Improve large write (such as, storing backup files) transfer speed | Most recent data in cache while less recent data continuously flushed to magnetic media | Keep flash empty, maximizing write cache hits into cache |
| Backup | Improve large read | Preload read ahead | Keep cache full |

TABLE 1-continued

| Cache Mode | Benefit | Cache Management Policy | Caching Policy Objective |
|---|---|---|---|
| Retrieval Mode | (such as restoring backup files) out of storage device | data from magnetic media into cache | with magnetic media read ahead, maximizing read cache hits out of cache. |
| Mixed Mode | Combination of Performance, Backup Archival Mode, Backup Retrieval Mode | Cache can be partitioned to include more than one mode | Combinations of the caching modes are selected. |

At 512, the information handling system can select a storage device caching mode from the available caching modes provide by the storage device. At 514, the information handling system can set partition zone sizes of the cache. For example, when the storage device supports a mixed mode cache, the information handling system can determine the amount of cache provided for each active mode. In this way, for example, a first portion of the cache can be configured for performance and a second portion of the cache can be configured for backup archival mode. At 516, the storage device can apply the caching policy per requested zone.

Figure 6:
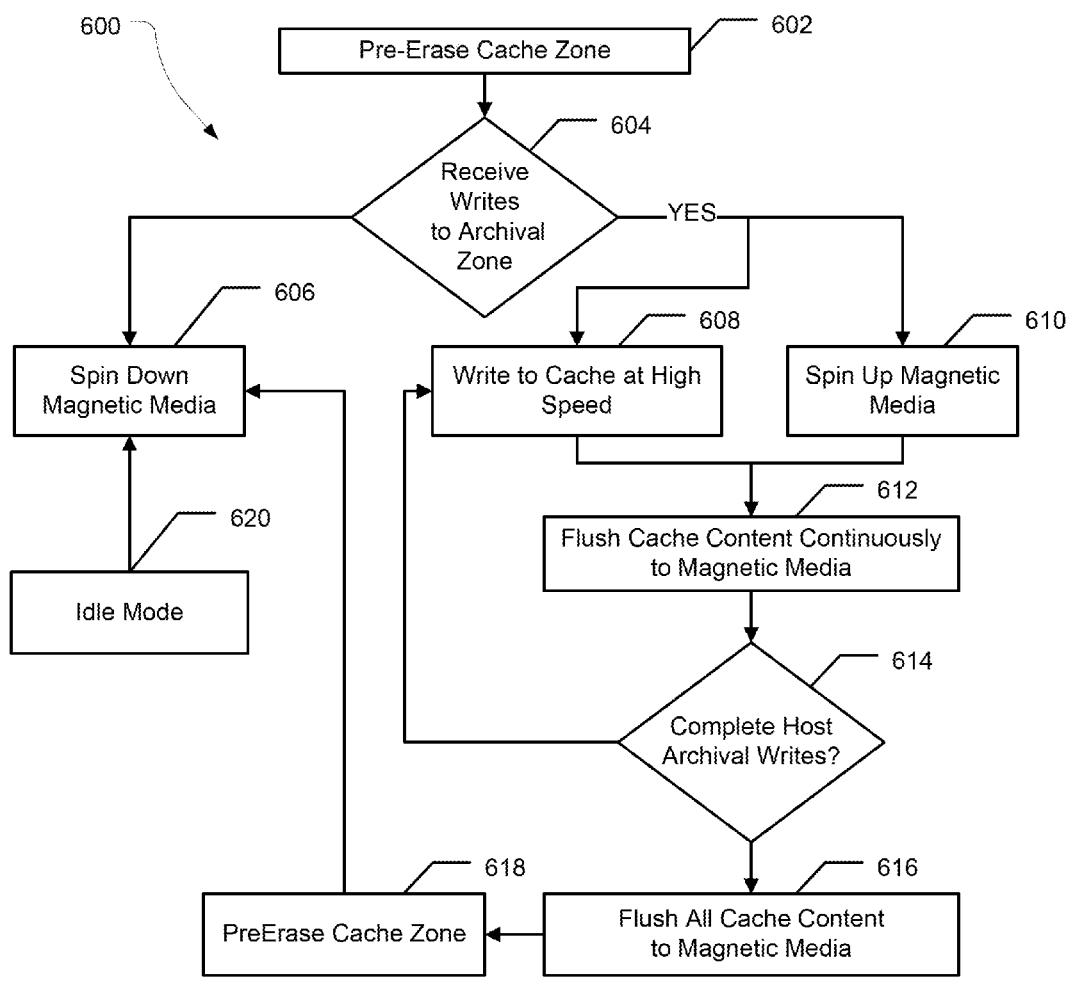
FIG. 6 is a flow diagram illustrating a method for using a cache of a storage device during backup.

FIG. 6 shows a method 600 of writing to a storage device using a cache with archival mode. At 602, the cache zone can be pre-erased. In various embodiments, the memory in the cache zone may be marked as unused rather than erased. At 604, it can be determined if the storage device is receiving writes to the archival zone from a host system. When the storage device is not receiving writes within a set time, the storage device can spin down the magnetic media, as illustrated at 606. Alternatively, when the storage device is receiving writes, the cache can accept the writes at high speed, as illustrated at 608, and the storage device can spin up the magnetic media, as illustrated at 610. By accepting the writes at the cache, the host system can perform additional writes rather than waiting for the magnetic media to spin up.

At 612, the contents of the cache can be continuously flushed to the magnetic media. As the data is flushed to the magnetic media, the portion of the cache that has been written to the magnetic media can be marked as free or erased in order to accept additional writes from the host. At 614, the storage device can determine if the host has completed the archival writes, such as when the host stops sending writes to the storage device. When the writes from the host have not completed, the cache can continue to receive the writes, as illustrated at 608. Alternatively, when the storage device is no longer receiving archival writes from the host, the storage device can flush the contents of the archival cache zone to the magnetic media, as illustrated at 616, and can pre-erase the cache zone, as illustrated at 618. Once the archival writes have been transferred to the magnetic media, the storage device can spin down the magnetic media, as illustrated at 606 and go into idle mode as illustrated at 620.

Figure 7:
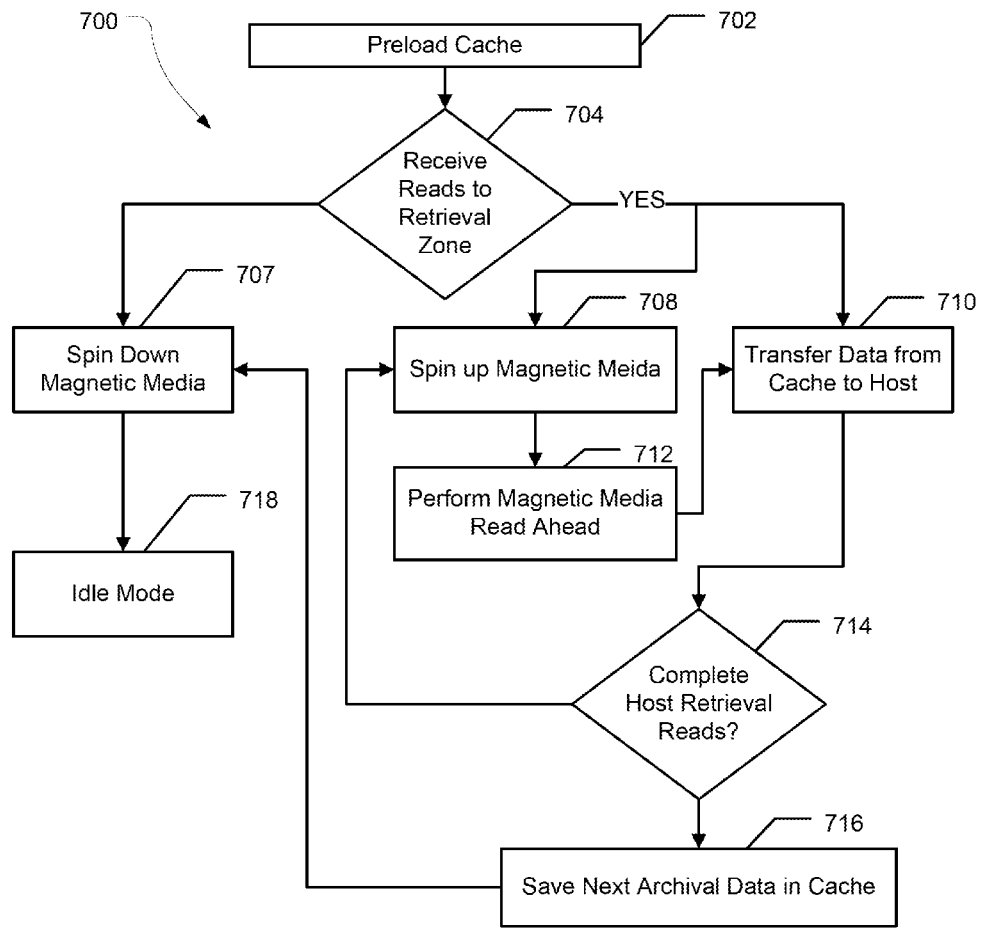
FIG. 7 is a flow diagram illustrating a method of using a cache of a storage device during retrieval.

FIG. 7 illustrates a method 700 of reading from a storage device using a cache with retrieval mode. At 702, the cache zone can be preloaded with data that is to be retrieved by the host. At 704, the storage device can determine if reads from the retrieval zone have been received. When reads from the retrieval zone have not been received, the storage device can spin down the magnetic media, as illustrated at 707 and enter idle mode at 718.

Alternatively, when the storage device receives read requests from the host for information, the storage device can spin up the magnetic media, as illustrated at 708. Additionally, the data can be provided to the host from the cache, as illustrated at 710. Providing the data from the cache can allow the host to receive the data without having to wait for the magnetic media to spin up. Additionally, as data is transferred to the host, portions of the cache can be marked as free or can be erased so the cache can accept additional data from the magnetic media. At 712, the magnetic media can perform a read ahead to keep the cache filled with data that is likely to be requested by the host.

At 714, the storage device can determine if the host has completed reading the retrieval data. When the host has not completed reading the data, the magnetic media can continue reading ahead to keep the cache full, as illustrated at 712, and the cache can continue transferring the data to the host, as illustrated at 710. Alternatively, when the host has completed reading the data, the next archival data can be saved to the cache, as illustrated at 716, and the storage device can spin down the magnetic media, as illustrated at 707.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A storage device comprising:
   a disk drive including:
      a magnetic media;
      a dynamically configurable cache memory, portions of the dynamically configurable cache memory configurable in archive zone, retrieval zone, or a combination thereof; and
      a drive controller configured to:
         maximize available empty space for writing data in the archival zone in accordance with an archival cache policy and maximize read ahead data available in the retrieval zone in accordance with a retrieval cache policy;
         flush write data from the archival zone to the magnetic media and erase the portion of the archival zone containing the write data, wherein the write data in the archival zone is not maintained in the cache memory for subsequent access;
         transfer read data from the retrieval zone to a host upon request by the host, wherein the read data is not maintained in the cache memory for subsequent access; and
         transfer read ahead data to the retrieval zone to replace data transferred to the host.

2. The storage device of claim 1, wherein the cache includes non-volatile random access memory (NVRAM).

3. The storage device of claim 2, wherein the NVRAM is a solid state memory.

4. The storage device of claim 1, wherein the cache includes dynamic random access memory (DRAM).

5. The storage device of claim 1, wherein a portion of the cache is in a performance mode having a most frequently used caching policy.

6. The storage device of claim 5, wherein the cache memory is configured to include a performance zone, and archival zone, and a retrieval zone.

7. The storage device of claim 1, wherein the cache memory is dynamically configured to operate as a performance zone, an archival zone, and a retrieval zone.

8. The storage device of claim 7, wherein the cache memory is automatically configured to operate as a performance zone, an archival zone, and a retrieval zone.

9. An information handling system comprising:
   a system storage;
   a processor; and
   a storage device comprising:
      magnetic media;
      a dynamically configurable cache memory, portions of the dynamically configurable cache memory configurable in an archival zone, a retrieval zone, or a combination thereof; and
      a drive controller configured to:
         maximize available empty space for writing data in the archival zone in accordance with an archival cache policy;
         maximize read ahead data available in the retrieval zone in accordance with a retrieval cache policy;
         flush write data from the archival zone to the magnetic media and erase the portion of the archival zone containing the write data, wherein the write data in the archival zone is not maintained in the cache memory for subsequent access;
         transfer read data from the retrieval zone to a host upon request by the host, wherein the read data is not maintained in the cache memory for subsequent access; and
         transfer read ahead data to the retrieval zone to replace data transferred to the host;
   wherein the processor is configured to communicate with the drive controller to:
      determine support for an archival mode;
      instruct the drive controller to utilize the archival mode; and
      write data from the system storage to the cache memory.

10. The information handling system of claim 9, wherein:
   the processor is further configured to communicate with the drive controller to:
      determine support for a retrieval mode,
      instruct the drive controller to utilize the retrieval mode;
      read data from the cache memory to the system storage.

11. The information handling system of claim 9, wherein a portion of the cache is in a performance mode having a most frequently used caching policy.

12. The information handling system of claim 9, wherein the system storage includes a hard disk drive.

13. The information handling system of claim 9, wherein the cache includes non-volatile random access memory (NVRAM).

14. The information handling system of claim 13, wherein the NVRAM is a solid state memory.

15. The information handling system of claim 9, wherein the cache includes dynamic random access memory (DRAM).

16. The information handling system of claim 9, wherein a portion of the cache is in a performance mode having a most frequently used caching policy.

17. The information handling system of claim 16, wherein the cache memory is configured to include a performance zone, and archival zone, and a retrieval zone.

18. The information handling system of claim 9, wherein the cache memory is dynamically configured to operate as a performance zone, an archival zone, and a retrieval zone.

19. The information handling system of claim 18, wherein the cache memory is automatically configured to operate as a performance zone, an archival zone, and a retrieval zone.

20. A non-transitory computer readable medium storing instructions to cause a computer to execute an archival and restore process, the archival and restore process comprising:
 establishing a portion of a cache memory as an archival zone to improve large writes to a storage device and a portion of the cache memory as a retrieval zone to maximize read hits, the cache memory being automatically configurable to operate as a performance zone, an archival zone, a retrieval zone or a combination thereof;
 maximizing available empty space for writing data in an archival zone of the cache memory in accordance with an archival cache policy;
 flushing write data from the archival zone to the magnetic media and erase the portion of the archival zone containing the write data, wherein the write data in the archival zone is not maintained in the cache memory for subsequent access;
 maximizing read ahead data available in the retrieval zone of the cache memory in accordance with a retrieval cache policy;
 transferring read data from the retrieval zone to a host upon request by the host, wherein the read data is not maintained in the cache memory for subsequent access; and
 transferring read ahead data to the retrieval zone to replace data transferred to the host.

\* \* \* \* \*